US011900712B2

(12) United States Patent
Bawolek et al.

(10) Patent No.: US 11,900,712 B2
(45) Date of Patent: Feb. 13, 2024

(54) METHOD AND APPARATUS FOR CAPTURE OF A FINGERPRINT USING AN ELECTRO-OPTICAL MATERIAL

(71) Applicant: Integrated Biometrics, LLC, South Carolina, SC (US)

(72) Inventors: Edward John Bawolek, Chandler, AZ (US); Douglas E. Loy, Gilbert, AZ (US)

(73) Assignee: Integrated Biometrics, LLC, Spartanburg, SC (US)

(*) Notice: Subject to any disclaimer, the term of this patent is extended or adjusted under 35 U.S.C. 154(b) by 312 days.

(21) Appl. No.: 17/201,722

(22) Filed: Mar. 15, 2021

(65) Prior Publication Data
US 2021/0200978 A1   Jul. 1, 2021

Related U.S. Application Data

(63) Continuation of application No. 15/821,942, filed on Nov. 24, 2017, now Pat. No. 10,949,642.

(51) Int. Cl.
| | |
|---|---|
| *G06V 40/13* | (2022.01) |
| *G02F 1/167* | (2019.01) |
| *G02F 1/1368* | (2006.01) |
| *G02F 1/163* | (2006.01) |
| *G06V 40/12* | (2022.01) |

(Continued)

(52) U.S. Cl.
CPC ........ *G06V 40/1318* (2022.01); *G02F 1/1368* (2013.01); *G02F 1/163* (2013.01); *G02F 1/167* (2013.01); *G02F 1/1685* (2019.01); *G06V 40/12* (2022.01); *G09G 3/344* (2013.01);

(Continued)

(58) Field of Classification Search
CPC .. G06V 40/1318; G06V 40/12; G02F 1/1368; G02F 1/163; G02F 1/167; G02F 1/1685; G09G 3/344; G09G 2354/00; H04N 25/709; H04N 25/76

See application file for complete search history.

(56) References Cited

U.S. PATENT DOCUMENTS

| | | |
|---|---|---|
| 6,327,376 B1 | 12/2001 | Harkin |
| 2005/0083270 A1 | 4/2005 | Miyazawa |

(Continued)

OTHER PUBLICATIONS

Takao; Hiroki, Sep. 2004, IEEE CAT. No. 04EX850, pp. 1-4 (Year: 2004).*

*Primary Examiner* — Stephen T. Reed
(74) *Attorney, Agent, or Firm* — Tucker Ellis LLP; Heather M. Barnes; Michael G. Craig

(57) ABSTRACT

A fingerprint image capture system comprises an electro-optical material which captures a static fingerprint image and an apparatus for converting the static fingerprint image into an electronic signal. The image capture system includes an electrode for contacting a finger, and a bias supply for creating an electric field where epidermal ridges contact the electro-optical material. A transistor array senses charge or optical density variations in the electro-optical material to create an electronic representation of the fingerprint image. An initialization electrode places the electro-optical material into a uniform condition prior to acquisition of the fingerprint image. A physical artifact of the fingerprint image can be archived by removing the electro-optical material from the system following the fingerprint image acquisition.

20 Claims, 12 Drawing Sheets

(51) Int. Cl.
*G02F 1/1685* (2019.01)
*G09G 3/34* (2006.01)
*H04N 25/76* (2023.01)
*H04N 25/709* (2023.01)

(52) U.S. Cl.
CPC ....... *G09G 2354/00* (2013.01); *H04N 25/709* (2023.01); *H04N 25/76* (2023.01)

(56) References Cited

U.S. PATENT DOCUMENTS

| | | |
|---|---|---|
| 2006/0047971 A1 | 3/2006 | Miyazaki et al. |
| 2008/0030844 A1* | 2/2008 | Choi ................ G02F 1/167 |
| | | 359/296 |
| 2009/0199004 A1 | 8/2009 | Krawczewicz et al. |
| 2010/0013791 A1 | 1/2010 | Haga et al. |
| 2013/0257802 A1* | 10/2013 | Lee ................... G06F 3/047 |
| | | 345/173 |
| 2013/0278542 A1* | 10/2013 | Stephanou ........ G06F 3/0414 |
| | | 345/174 |
| 2013/0335349 A1 | 12/2013 | Ferren et al. |
| 2017/0147865 A1 | 5/2017 | Jensen et al. |
| 2017/0270333 A1 | 9/2017 | Jeon et al. |
| 2018/0181788 A1 | 6/2018 | Chen et al. |

\* cited by examiner

METHOD AND APPARATUS FOR CAPTURE OF A FINGERPRINT USING AN ELECTRO-OPTICAL MATERIAL

CROSS REFERENCE TO RELATED APPLICATIONS

This application is a continuation of U.S. Ser. No. 15/821,942, entitled METHOD FOR CAPTURE OF A FINGERPRINT USING AN ELECTRO-OPTICAL MATERIAL, filed Nov. 24, 2017, which is incorporated herein by reference.

BACKGROUND

The present invention is related to the capture and retention of a fingerprint image. More specifically, the present invention provides an improved method and apparatus for capturing a fingerprint while achieving other useful objectives such as simplification of power supply electronics and non-volatile storage with a physical artifact for archival.

Fingerprint capture devices are finding increased use in law enforcement, security, financial, and other applications. The underlying motivation for fingerprint acquisition is the widely accepted belief that fingerprints are unique to an individual, and therefore comprise an exclusive attribute of identification. Biologically, fingerprints consist of raised portions of the epidermis, termed friction ridges or epidermal ridges, on the digits (fingers and toes), the palm of the hand or the sole of the foot, comprising one or more connected ridge units of friction ridge skin. By virtue of this description, it should be evident that the term "fingerprint" can apply to several parts of the anatomy, which exhibit a uniquely defined pattern in the epidermis. Historically, fingerprint images were acquired for analysis and archival by application of ink to the skin, followed by making an impression of the skin onto a sheet of paper or cardstock.

The usefulness of a particular fingerprint or set of fingerprint images is intimately tied to their comparison and matching to a known set or database of other fingerprint images. Prior to the availability of computer-based storage systems, comparison and matching were performed manually, and fingerprint images required physical archival. The development of digital storage systems created an opportunity and need for electronic means to acquire fingerprints so as to enable rapid storage, distribution, and searching. A variety of techniques have been developed for this purpose. The internet encyclopedia Wikipedia broadly groups fingerprint readers into solid-state devices and optical readers utilizing one of several physical principles including optical, ultrasonic, capacitive or thermal means for detecting the difference between valleys and ridges on the skin.

In one example of a popular fingerprint acquisition system a Light Emitting Sensor film is used to create a visible image of a fingerprint by electrically exciting a light emitting phosphor using the ridges of the epidermis to couple an alternating current (ac) power source to the film. With reference to FIG. 1, a fingerprint acquisition system and detection film detail of the prior art, a fingerprint acquisition system 100 has capture and display device 110 showing a luminescent fingerprint image 120. An acquisition electronics detail 130 includes skin epidermal ridges 140 making an electrical contact to light emitting film 150 on the surface of an image array sensor 160. An alternating current (to be described infra) is coupled from the skin to the light emitting film 150, which causes the film to glow at the points of contact, resulting in luminescent fingerprint image 120. The image array sensor 160 can be comprised of thin film transistors, cmos sensor pixels, or a ccd device. Skilled artisans will appreciate that the image sensor 160 is essentially similar to image capture devices widely employed in smart phone cameras, video capture devices, scanners, and digital x-ray detectors. The image capture process can employ electronics and software for image acquisition well known to those skilled artisans. The light emitting film 150 is detailed in light emitting film cross section 170, which illustrates the connection of an ac power supply 180 between a top electrode and a phosphor layer within the film. In operation, the fingerprint acquisition system 100 is configured so that the top electrode contacts a portion of the skin, making the epidermal ridges into an electrical potential node. An electrical current is induced between the epidermal ridges and the phosphor layer, providing the energy needed for the phosphor to glow.

The prior art fingerprint acquisition system of FIG. 1 has several undesirable characteristics: First, the visible fingerprint image is present only for the duration that the finger is in contact with the light emitting film and the ac power is applied. Absent a separate retrieval and display system, the fingerprint image cannot be examined once the finger has ceased contact with the device. Because the fingerprint image is constrained to only the portion of the finger contacting the device, it is not possible to obtain an extended contact image by rolling the finger from one side to another. The technique of rolling the finger is commonly employed when acquiring fingerprint images by means of ink and paper. These extended images are valuable for matching to forensic evidence, which often includes incomplete or partial fingerprint images acquired from a variety of objects at crime scenes. Next, in order to effectively induce phosphor luminescence, the ac power supply must be of relatively high frequency and moderately high voltage. Typically, the electrical potential is about 80 to 250 volts or more at a frequency of about 500 Hz to 40 kHz. The power supply needed to generate these operating conditions typically adds complexity, cost, and lowers efficiency as compared with a typical low voltage direct current (dc) power supply. Because the visible fingerprint image depends on light emission from a phosphor, the image may be rendered difficult or impossible to see under conditions of high external illumination, for example outside in bright sunlight.

What is needed is an improved means for acquiring a fingerprint image that combines simple low power electronics, image retention during and following capture, and sunlight readability in a low cost system. In particular, a system which combines the best features of both electronic and traditional paper/ink based fingerprint capture would advance the state of the art.

In order to better illustrate the features of the present invention, attention is now directed to FIG. 2, an example of an electrophoretic display material 200 known in the prior art. Electrophoretic materials are a portion of a broad class of opto-electronic materials which exhibit a change in visible appearance or optical characteristics in response to the application of an electric field. The electrophoretic display material 200 typically has a transparent protective layer 210, a transparent electrode layer 220, with transparent micro-capsules 230 in contact with the transparent electrode layer 220. In one commercial implementation, the transparent micro-capsules 230 are each about 50 to 100 microns in diameter and contain positively charged white pigments 240A and negatively charged black pigments 240B suspended in a transparent fluid 250. A free surface 260 of the electrophoretic display material is typically placed in contact with an array of pixel electrodes, to be described infra. When an electric field is applied between the transparent electrode layer 220 and the free surface 260, the corresponding charged pigments become visible at the transparent electrode layer 220. The electric field is produced by applying a potential between the transparent electrode layer 220 and pixel electrodes which are typically part of a thin film transistor (TFT) backplane to which the electrophoretic display material 200 is laminated. A first bias condition is produced by positively charged pixel electrodes 270A. This first bias condition results in incident white light illumination 280 having a white-colored response 290A. A second bias condition is produced by negatively charged pixel electrodes 270B. This second bias condition results in incident white light illumination 280 having a black-colored response 290B. The charge to each capsule can also be bifurcated resulting in a half white half black surface. A combination of both positive and negative charges produces bifurcated pixel electrodes 270C. This bifurcated charge condition results in incident white light illumination having a gray-colored response 290C.

Other variations of electrophoretic materials are known which produces a similar optical response to applied electric fields. For example, in a presentation "Low Cost Flexible Displays Using Nanoscale Droplets" by Mateusz Bryning, PhD a display material is described as comprising charged nanosize ink droplets dispersed in a porous matrix. In a presentation published on the World Wide Web, CLEARink Displays discloses an electrophoretic display material in which charged particles modulate the response of the display material by disrupting a process of total internal reflection in the top plane of the display material.

SUMMARY

The needs for an improved fingerprint acquisition device and system have been met in the present invention, which presents a method and an apparatus for acquiring a fingerprint image by placing a finger into contact with an opto-electronic material. In an exemplary embodiment of the present invention, the opto-electronic material is a pigmented electrophoretic material. The electrophoretic material is placed into an initial condition by any of a plurality of means explained infra, so that a first surface of the electrophoretic material is uniformly colored, typically all white or all black. A first power supply node is coupled to one side of the electrophoretic material, and a second power supply node is coupled to the finger to be fingerprinted. When the finger is brought into contact with the electrophoretic material on a surface opposing the first power supply node, the epidermal ridges act as electrodes and induce local movement of the pigment particles in the electrophoretic material. As a result, an image of the fingerprint is generated in the electrophoretic material, with said image having a strong resemblance to a traditional ink on paper fingerprint.

When the finger being fingerprinted is removed from the surface of the electrophoretic display material, the created image remains. If the bias potential is removed or disconnected, there is no effect upon the fingerprint image. In this condition, the electrophoretic display material can be archived in a manner analogous to an ink on paper fingerprint. In the alternative, the fingerprint image can be incorporated into an electronic storage medium by any of several means. In one exemplary embodiment of the present invention, a conventional CMOS (Complementary Metal Oxide Semiconductor) imaging device, well known to skilled artisans, can be employed to capture an electronic image of the fingerprint image. In another exemplary embodiment of the present invention, the electrophoretic display material can be coupled to a thin film transistor (TFT) array which can read the fingerprint image by optical or charge-sensing means.

DETAILED DESCRIPTION

Figure 1:
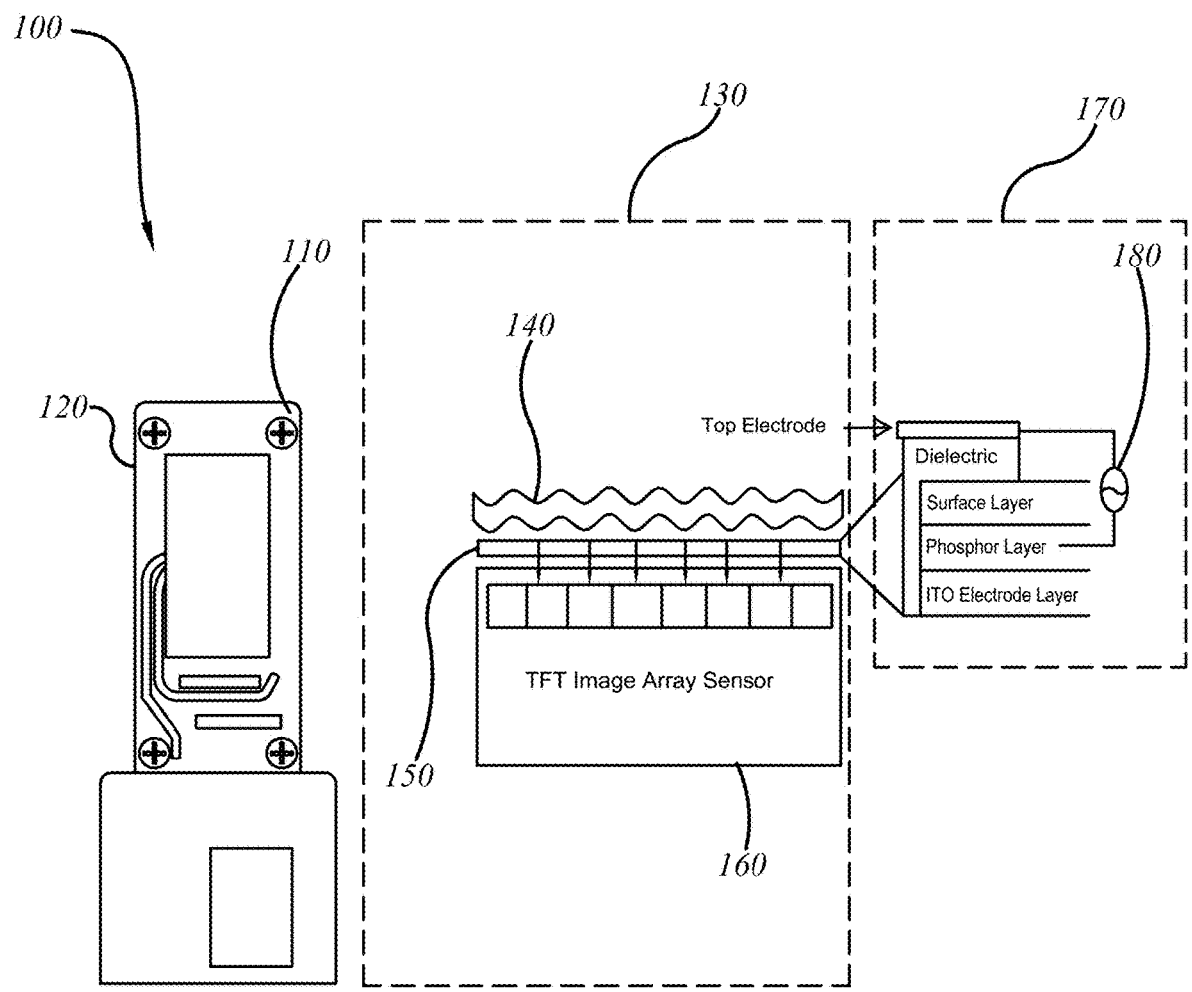
FIG. 1 is a fingerprint acquisition system according to the prior art.
Figure 2:
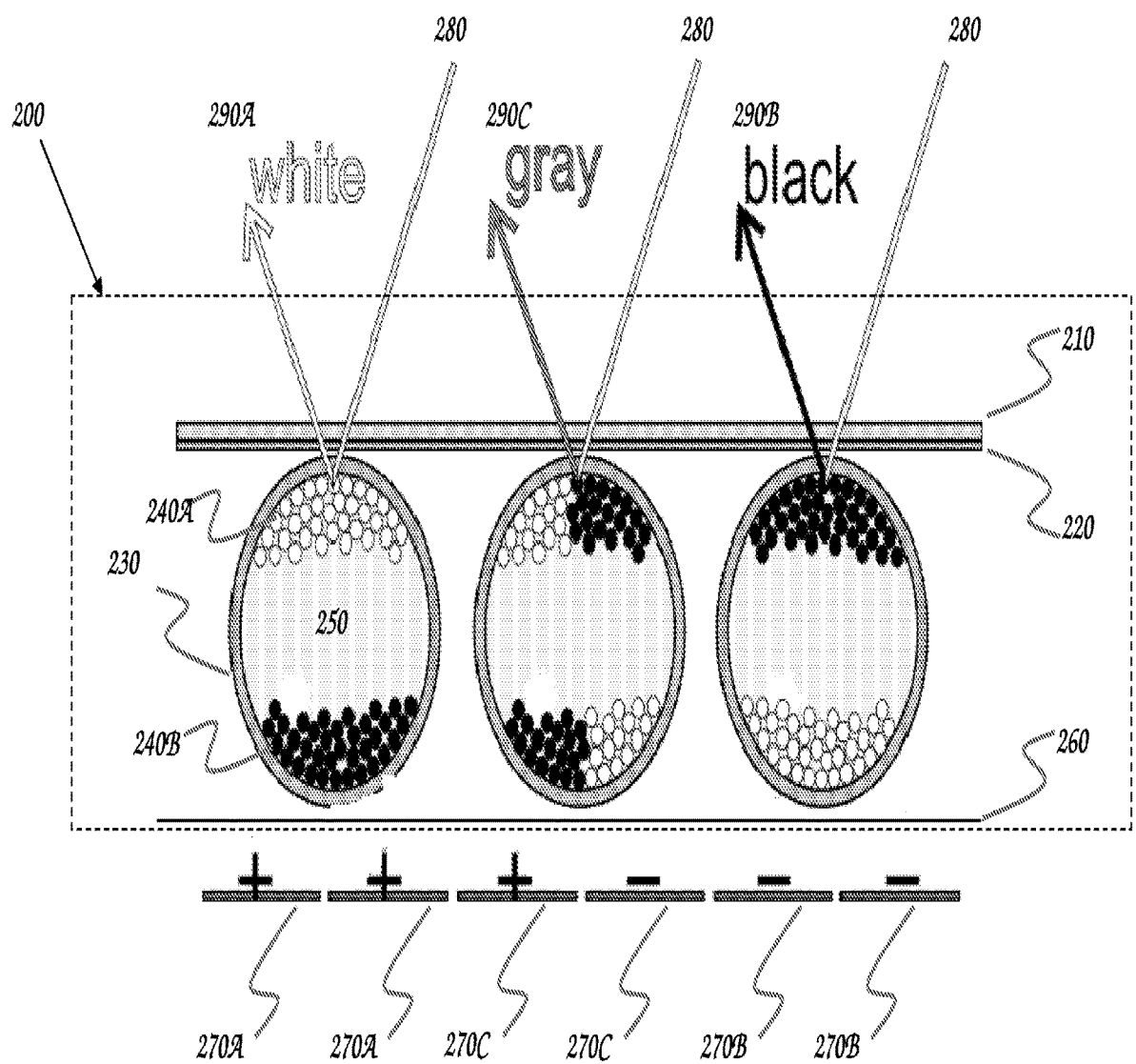
FIG. 2 shows a diagram of an electrophoretic display material and its response to an electric potential.
Figure 3:
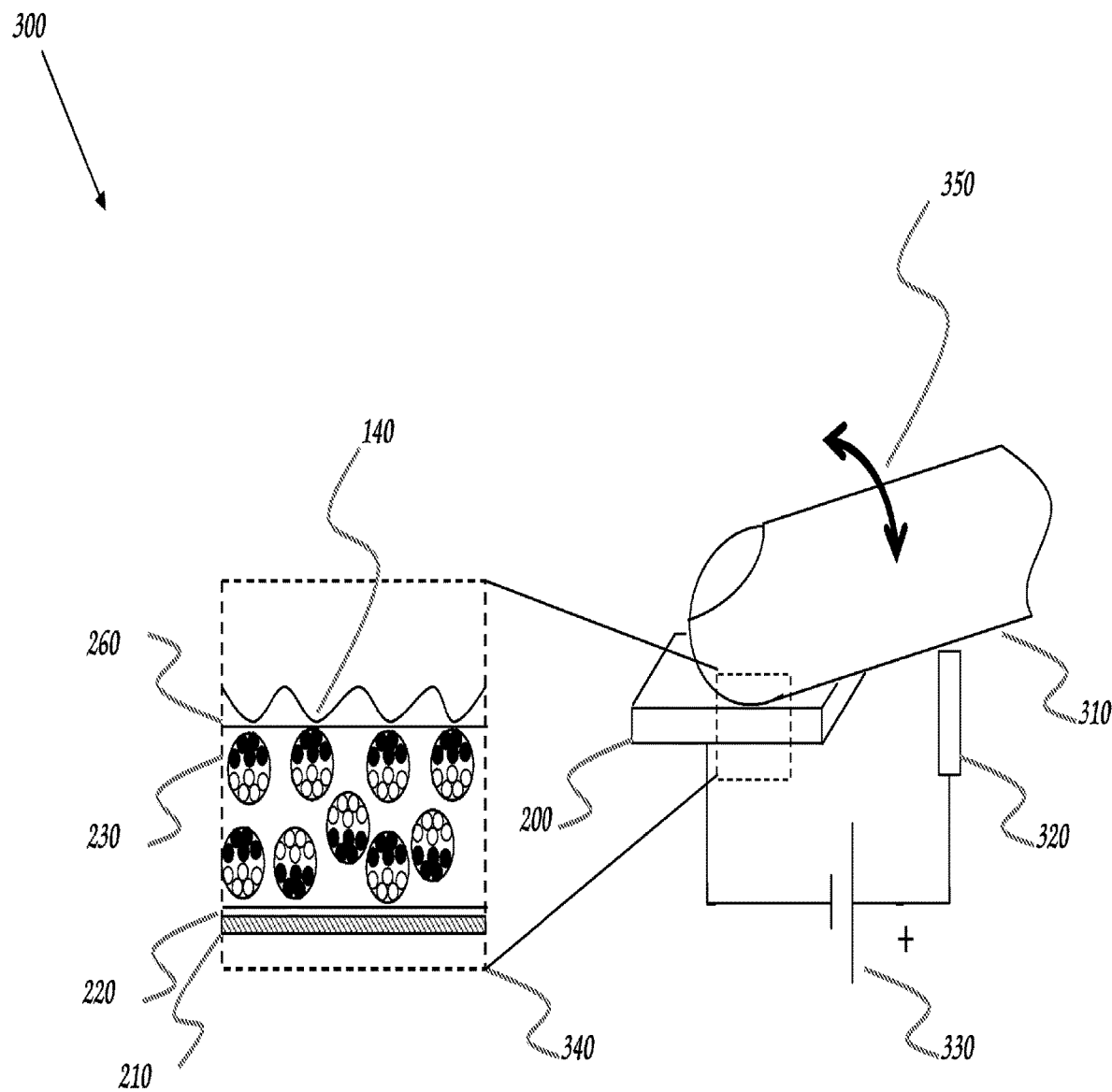
FIG. 3 is a pictorial representation showing a simplified system and method for acquisition of a fingerprint using an electrophoretic material.

With reference to FIG. 3, an exemplary embodiment of the present invention comprises a fingerprint sampling apparatus 300. Finger 310 is coupled to an electrode 320. A direct current (DC) bias supply 330 having a positive potential and a negative potential is coupled to the electrode 320 and to electrophoretic display material 200. In the exemplary embodiment, the positive potential of the direct current (DC) bias supply 330 is coupled to the electrode 320 and the negative potential is coupled to the electrophoretic display material 200 by coupling to the transparent electrode layer 220. A typical value for direct current (DC) bias supply 330 is about 15 volts; a range of possible potentials for direct current (DC) bias supply 330 is between about 1 volt and 30 volts. Inset 340 provides additional detail for the electrophoretic display material 200 and its interaction with finger 310. As shown in the inset 340, the electrophoretic display material 200 comprises the free surface 260, transparent protective layer 210 and transparent micro-capsules 230. Epidermal ridges 140 present on finger 310 make contact with free surface 260 and the positive bias on electrode 320 is coupled through finger 310 to the epidermal ridges 140. Transparent micro-capsules 230 are attracted to the points of epidermal contact such that black pigments within the capsules are brought to free surface 260. This alignment of the transparent micro-capsules 230 results in the creation of a fingerprint image. The fingerprint image is stable unless deliberately altered; this stability will be discussed further infra. Because the acquired image is stable, it is possible to extend the fingerprint image by a side-to-side rolling action 350, in a manner completely analogous to the creation of a paper and ink fingerprint image. The ability to acquire these extended fingerprints is an important feature of the present invention.

Skilled artisans will appreciate that a variety of electro-optical materials may be successfully employed for acquisition of the fingerprint image. The key attributes required for the electro-optical material are the ability to change optical appearance with the application of an electric field, and the ability to retain the image following termination of the finger contact. A specific example of a material meeting these requirements is an electrochromic material, such as described by Switch Materials Inc. in a presentation on the World Wide Web. In this instance, the electrochromic material can be induced to change from a darkened state to a substantially transparent state by application of an electric field. The material can be returned to the darkened state by removal of the electric field and illumination with illumination of sufficient intensity, such as daylight.

Figure 4:
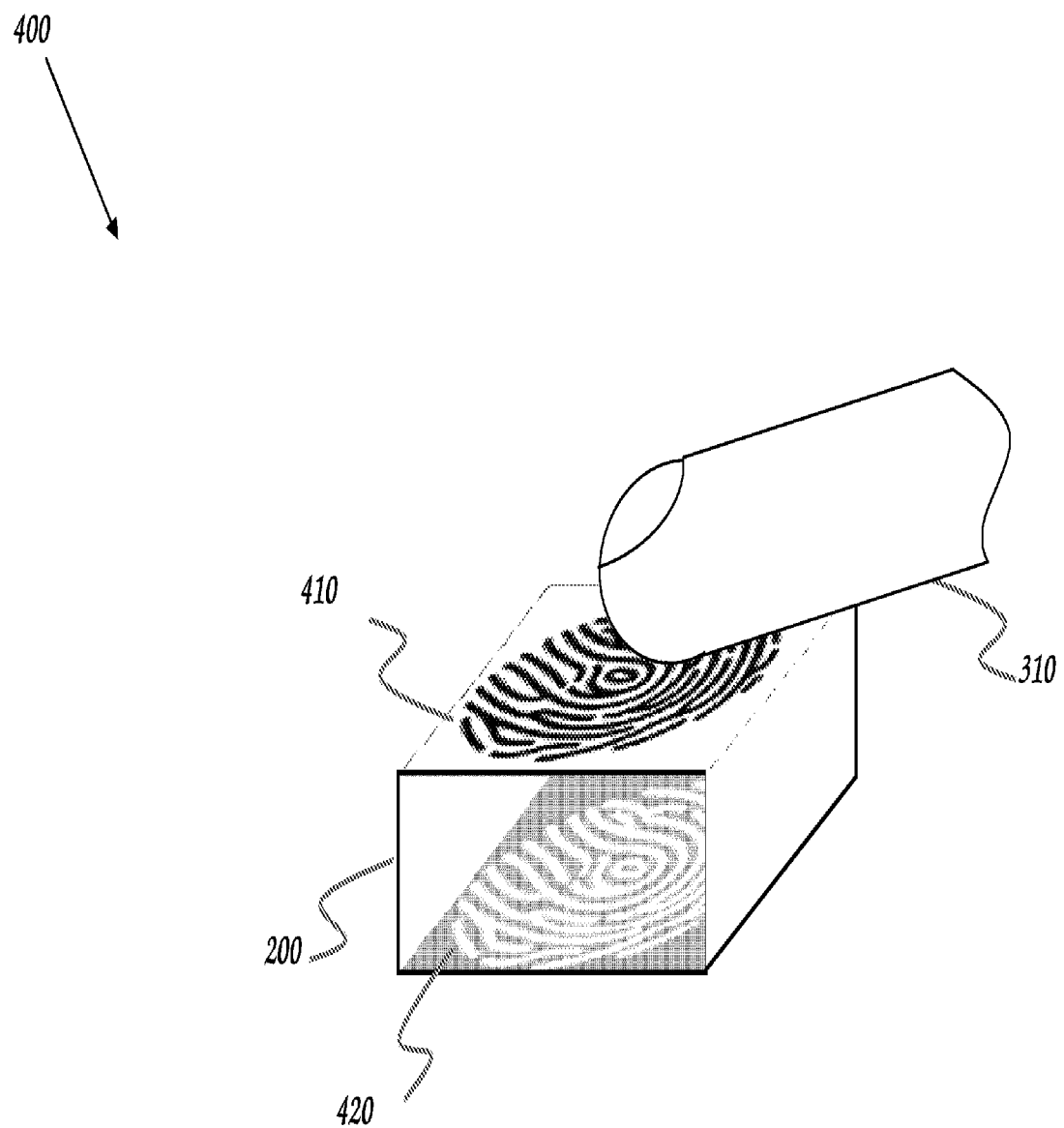
FIG. 4 is a pictorial representation of opposing surface images of an acquired fingerprint.

Additional detail of the fingerprint image is presented in FIG. 4 for an exemplary embodiment of the present invention in which the opto-electronic material is an electrophoretic display material. For the bias conditions outlined supra, the acquired fingerprint image will produce a contact side fingerprint image 410 having a white background with black lines corresponding to the points of contact between the finger epidermal ridges and the electrophoretic display material 200. The construction of the electrophoretic display material 200 is such that on the side opposite to contact side, an opposing side fingerprint image 420 will be formed. The opposing side fingerprint image will be a negative mirror image of contact side fingerprint image 410. Skilled artisans will appreciate that other opto-electronic materials may not produce the opposing side fingerprint image 420. For example, electrophoretic materials which alter appearance based on a change in internal reflection will evidence a fingerprint image on only one surface. Other electro-optic materials, for example an electrochromic material, will produce an image which is substantially uniform on both sides of the material, excepting for a mirroring of the image.

Figure 5:
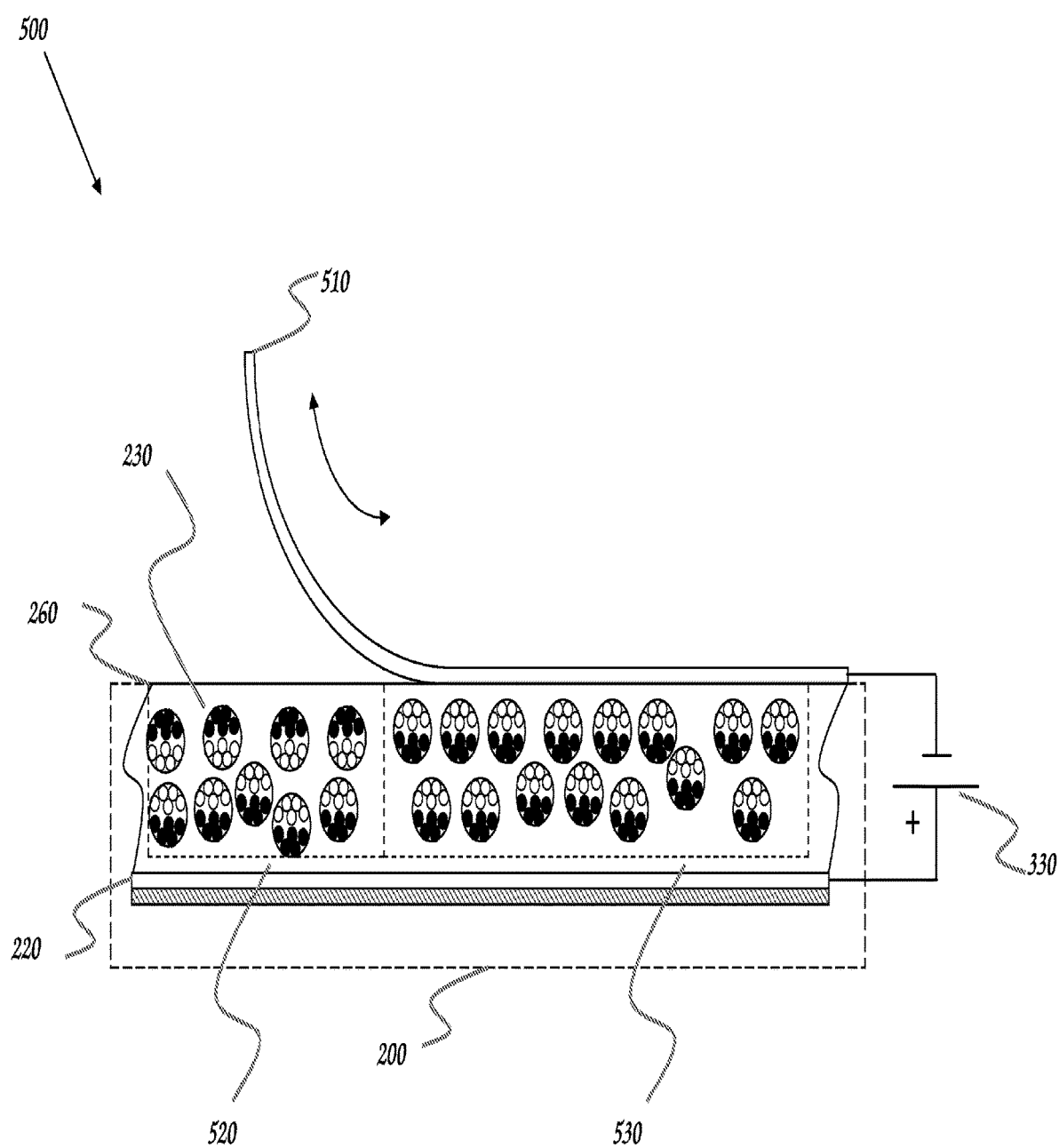
FIG. 5 is an illustration of a method for setting an initial condition in an electrophoretic material.

Prior to the acquisition of a fingerprint, the electrophoretic display material 200 must be initialized into a condition of uniform appearance. Additionally, once acquired a fingerprint image will be stable until the electrophoretic material is reinitialized. With reference to FIG. 5, in an exemplary embodiment of the present invention an initialization method 500 comprises a flexible electrode film 510 placed into contact with the free surface 260 of the electrophoretic display material 200 having a region of unaligned pigments 520. The direct current (DC) bias supply 330 is coupled to the flexible electrode film 510 and to the transparent electrode layer 220. As contact is initiated between the flexible electrode film 510 and the free surface 260, transparent micro-capsules 230 align according to the polarity of the applied bias, producing a region of uniformly aligned pigments 530. In FIG. 5, the polarity of the direct current (DC) bias supply 330 is shown configured to cause the transparent micro-capsules 230 to align such that the white pigments are presented to the free surface 260. Reversing the polarity of the direct current (DC) bias supply 330 would conversely cause the black pigments to be presented to the free surface 260. Initialization is complete when the entire free surface 260 has been brought into contact with the flexible electrode film 510. Once initialization has been completed, the flexible electrode film 510 can be retracted and the direct current (DC) bias supply can be removed without changing the appearance of the electrophoretic display material 200. The electrophoretic display material 200 is now ready for a new fingerprint acquisition.

Once a fingerprint image has been captured, a plurality of methods are available for the purpose of storage and archival of the image. In a first exemplary embodiment of the present invention, the electrophoretic display material 200 is simply disconnected from direct current (DC) bias supply 330. With the direct current (DC) bias supply 330 removed, the fingerprint image will remain stable on the electrophoretic display material 200. Skilled artisans will appreciate that it would be a very simple matter to make a small piece of electrophoretic display material 200 removable from fingerprint sampling apparatus 300, producing a stable artifact which could be shared and archived much like a paper-and-ink fingerprint. Pre-initialized coupons of electrophoretic display material 200 could be replaced into fingerprint sampling apparatus 300, enabling capture of additional fingerprints, each fingerprint having its own stable artifact in the form of a dedicated piece of electrophoretic display material 200.

Figure 6:
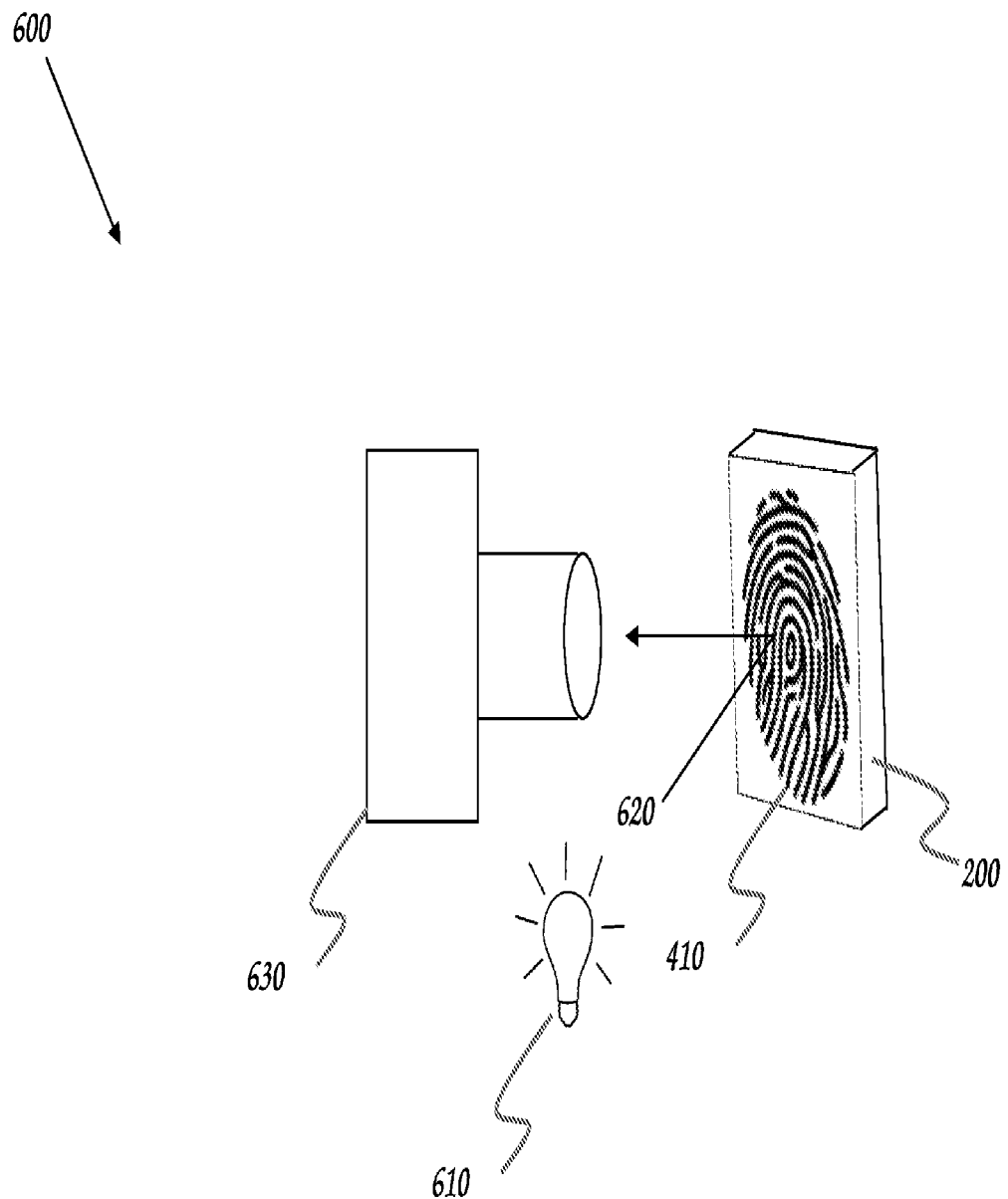
FIG. 6 shows a method for fingerprint image capture by reflection of alight source from the image.

In a second exemplary embodiment of the present invention, the fingerprint image is captured by means of a conventional imaging apparatus. With reference to FIG. 6, reflective fingerprint image capture system 600 comprises an illumination source 610 producing illumination 620, which impinges on contact side fingerprint image 410 present on electrophoretic display material 200. Illumination 620 is reflected back to imager 630 which captures the fingerprint image by an of a plurality of methods know to skilled artisans. For example, imager 630 may be a CMOS imager of the kind frequently found in smart phones. Alternately, imager 630 could be a CCD device, or other imaging array. Imager 630 may even comprise a conventional camera utilizing light-sensitive chemical emulsion film. Once the fingerprint image has been captured by imager 630, the image can be stored and shared by electronic means well known to skilled artisans; the required technology is well known in the typical smartphone. Skilled artisans will appreciate that is also possible to configure the capture system 600 so as to acquire the opposing side fingerprint image 420. This configuration is not shown to avoid obscuring the present invention.

Figure 7:
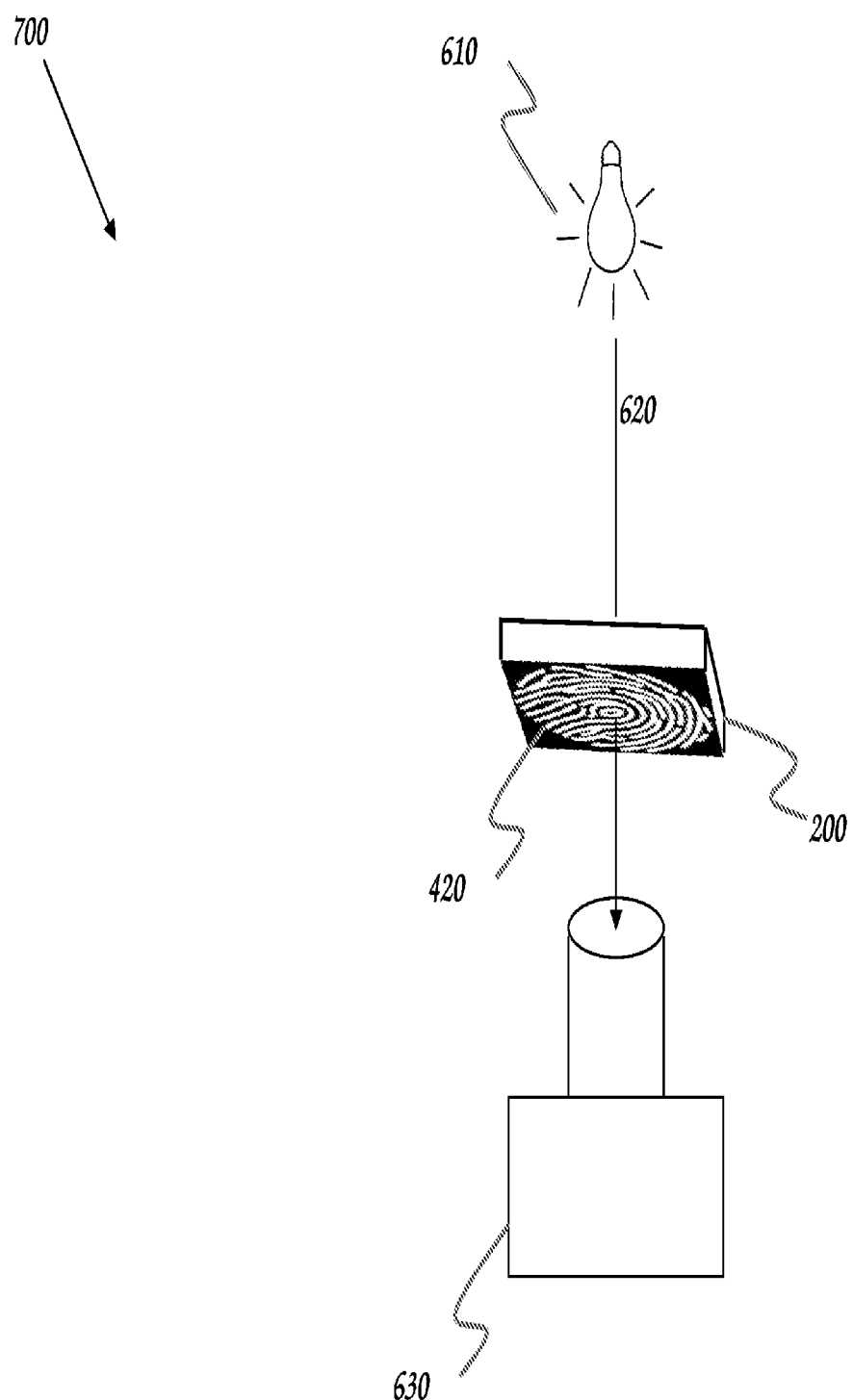
FIG. 7 shows a method for fingerprint image capture by transmission of a light source through the image.

A third exemplary embodiment of present invention appears in FIG. 7 as transmissive fingerprint image capture system 700. In this embodiment, illumination source 610 and imager 630 are arranged so as to be separated by electrophoretic display material 200. Illumination 620 is transmitted through electrophoretic display material 200, conveying opposing side fingerprint image 420 to imager 630. Skilled artisans will appreciate that numerous variations are possible for illumination source 610 and imager 630. For example, in some instances ambient illumination may be sufficient to obviate the need for a dedicated source. Alternately, illumination source 610 could be a visible light emitting diode (LED), an incandescent lamp, or other luminescent material. The illumination source need not be discrete; edge-illumination techniques are well known to those skilled in the art and are frequently employed in commercial display devices. If it were desirable to limit visible light radiation, illumination source 610 could be an infrared-emitting LED, or other wavelength-specific LED matched to the characteristics of the imager 630.

Figure 8A:
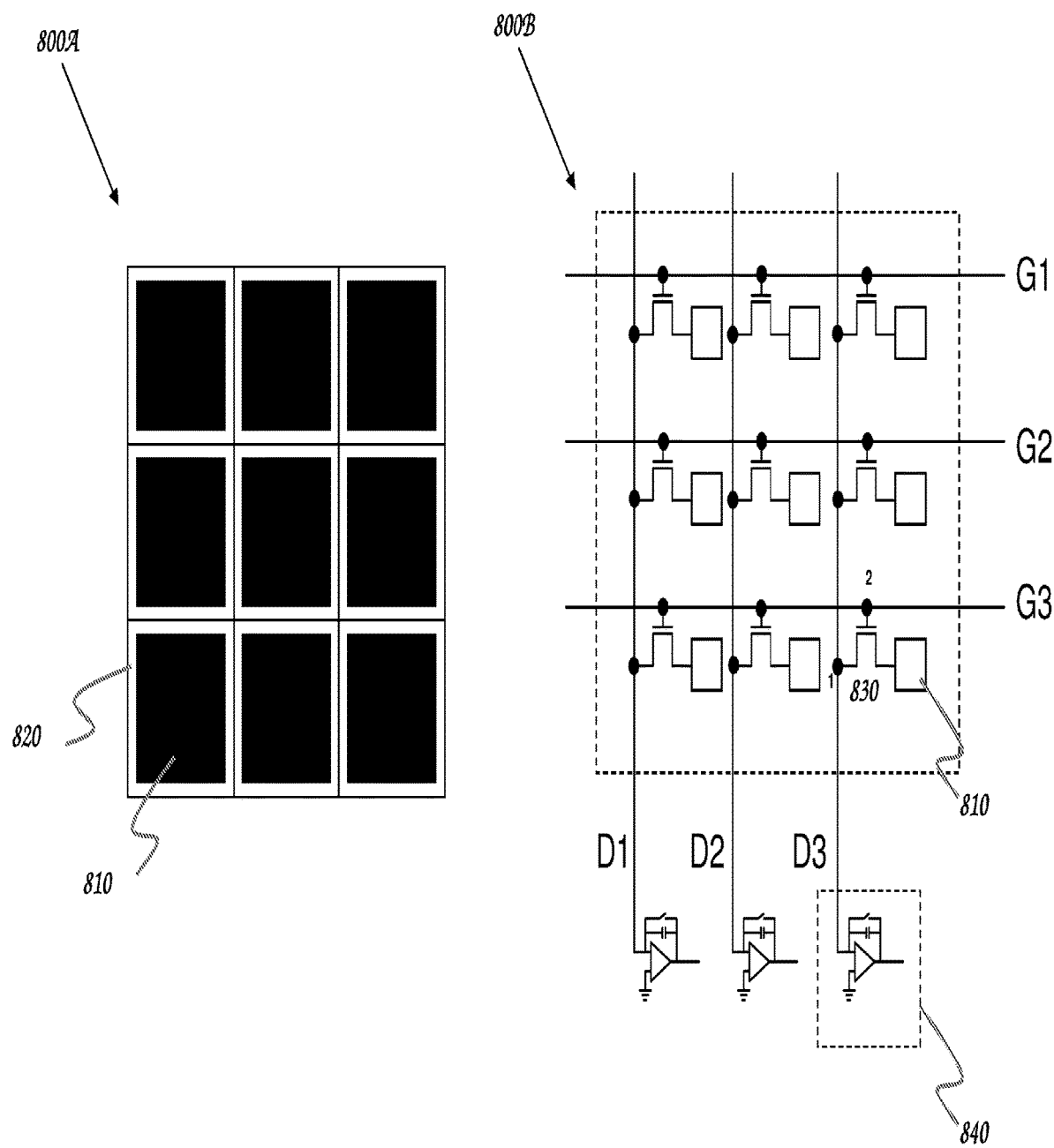
FIG. 8A shows a pictorial representation and a schematic representation of a transistor array portion according to the prior art.

Additional embodiments of the present invention use a transistor array to store the captured fingerprint image electronically. Transistor arrays are widely known to skilled artisans for their use in CMOS imagers, electronic x-ray detectors, television and smartphone displays, and scientific instruments. To better illustrate the application of a transistor array in the present invention, attention is directed to FIG. 8A, an illustration of a portion of a transistor array known in the prior art. Transistor array portion 800A typically comprises an array of pixel elements fabricated on a substrate using any of a plurality methods known to artisans skilled in semiconductor device fabrication. Common fabrication techniques include CMOS devices fabricated on crystalline silicon wafers and thin film transistor (TFT) arrays fabricated on glass or flexible substrates. The CMOS transistor arrays are often employed for digital image capture devices such as cameras and high resolution dental x-rays. The thin film transistor arrays are frequently found in display and television screen applications. [Thin film transistor arrays can be fabricated by a large number of techniques using materials such as low temperature poly-silicon (LTPS), amorphous silicon (aSi), organic semiconductors, and mixed metal oxides such as indium gallium zinc oxide (IGZO). Further, those thin film transistor arrays can be produced on a wide variety of substrates such as glass, flexible polymers, and even paper. Therefore, the usage of the term thin film transistor array with respect to the present invention should be understood as not being limited to a specific transistor material chemistry or substrate.] Transistor array portion 800A includes a pixel electrode 810 and an inactive zone 820. The actual number of pixels in transistor array portion 800A can be varied by changing the number of rows and columns to be fabricated using methods well known to skilled artisans. Array sizes can be quite large, having many millions of pixels.

The electrical operation of transistor array portion 800A can be understood with reference to transistor array portion schematic 800B illustrating how elements of the array are interconnected. The array portion comprises gate lines GI, G2, and G3 running parallel in a first direction, and data lines DI, D2, and D3 running parallel so as to be orthogonal to gate lines GI, G2, and G3. Each pixel includes a transistor 830 having a gate node I coupled to an array gate line, and a source node 2 coupled to an array data line. The drain node of transistor 830 is coupled to pixel electrode 810. The data lines DI, D2, and D3 are each coupled to a charge-sense amplifier 840. The charge sense amplifier 840 measures the charge present on its respective data line and converts that charge measurement to an electrical potential. Charge sense amplifier 840 may be coupled to an analog to digital converter (ADC) circuit to create a digital representation of the electrical charge measurement. The ADC circuit is not shown to avoid obscuring the present invention. Skilled artisans are familiar with methods for applying time-varying electrical potentials to the gate lines and data lines so as to be able to individually address individual pixels and measure the charge of each. The collection of measurements can be combined to yield a conventional digital image representation of the array configuration.

Figure 8B:
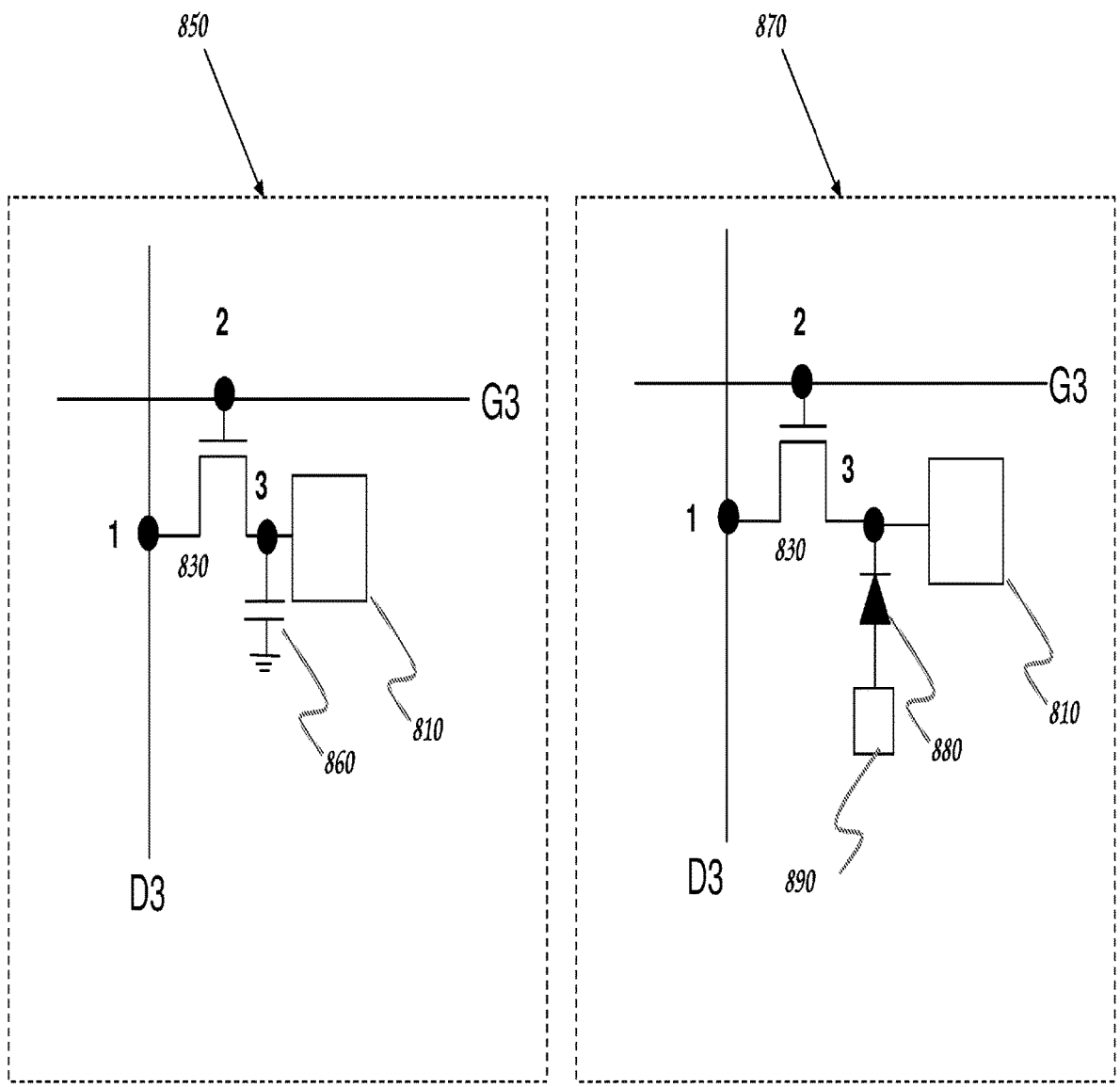
FIG. 8B shows two schematic variations for transistor array pixel construction according to the prior art.

The pixel construction may be varied according to the intended use and purpose of the transistor array. With reference to FIG. 8B, a first pixel design variation 850 includes a capacitor 860 coupled to a drain node 3 of transistor 830. The capacitor 860 is also typically coupled to a ground potential. The capacitor 860 stores charge, holding a potential on pixel electrode 810 constant when transistor 830 is biased so as to electrically decouple pixel electrode 810 from the gate and source lines. This can be useful in display application when it is desirable to maintain a constant pixel state without continuously providing a voltage bias by maintaining transistor 830 in an electrically conductive state. With further reference to FIG. 8B, a second pixel design variation 870 includes a photodiode 880 coupled to drain node 3 of transistor 830. Photodiode 880 is coupled to bias connection 890 which provides a common electrical node for setting a voltage potential on all photodiodes comprising the transistor array. The photodiode 880 is light sensitive and is typically fabricated on an upper surface of the pixel. When appropriately biased using techniques known to skilled artisans, photodiode 880 is capable of providing a quantity of electrical charge proportional to the degree of illumination on the pixel.

Figure 9:
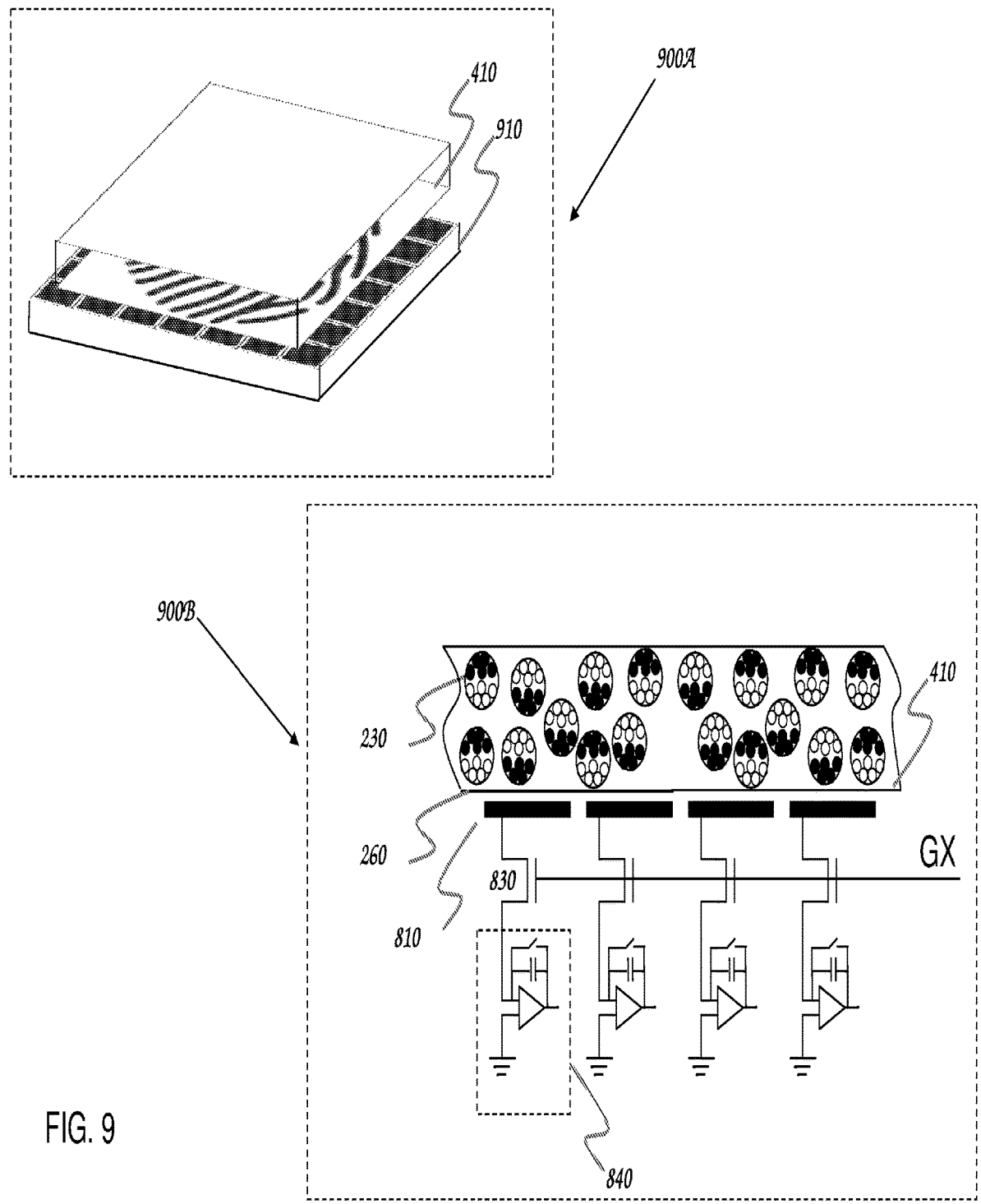
FIG. 9 shows a transistor array configured to sense charge coupled to an electrophoretic material.

An exemplary use of a transistor array to capture a fingerprint image by means of sensing charge appears in FIG. 9. Charge sense configuration 900A comprises contact side fingerprint image 410 coupled to transistor array 910, configured to sense pixel charge. Charge sense configuration cross section 900B further illustrates the operation of the system. Contact side fingerprint image 410 is comprised of transparent micro-capsules 230 near free surface 260. The transparent micro-capsules 230 each possess a small amount of electrical charge, analogous to an electrical capacitor. The orientation of the transparent micro-capsules determines the polarity and quantity of charge which is presented to free surface 260. The free surface 260 is coupled to pixel electrodes 810, which are in turn coupled to transistors 830. When positively biased, gate line GX places transistors 830 into a conductive condition. The electrical charge possessed by transparent micro-capsules 230 is transferred through transistors 830 to the charge sense amplifier 840. The charge sense amplifier 840 produces a voltage output which is proportional to the degree of charge transferred. Hence, the voltage output provides an indication of the fingerprint image as represented by the condition of the transparent micro-capsules 230.

Figure 10:
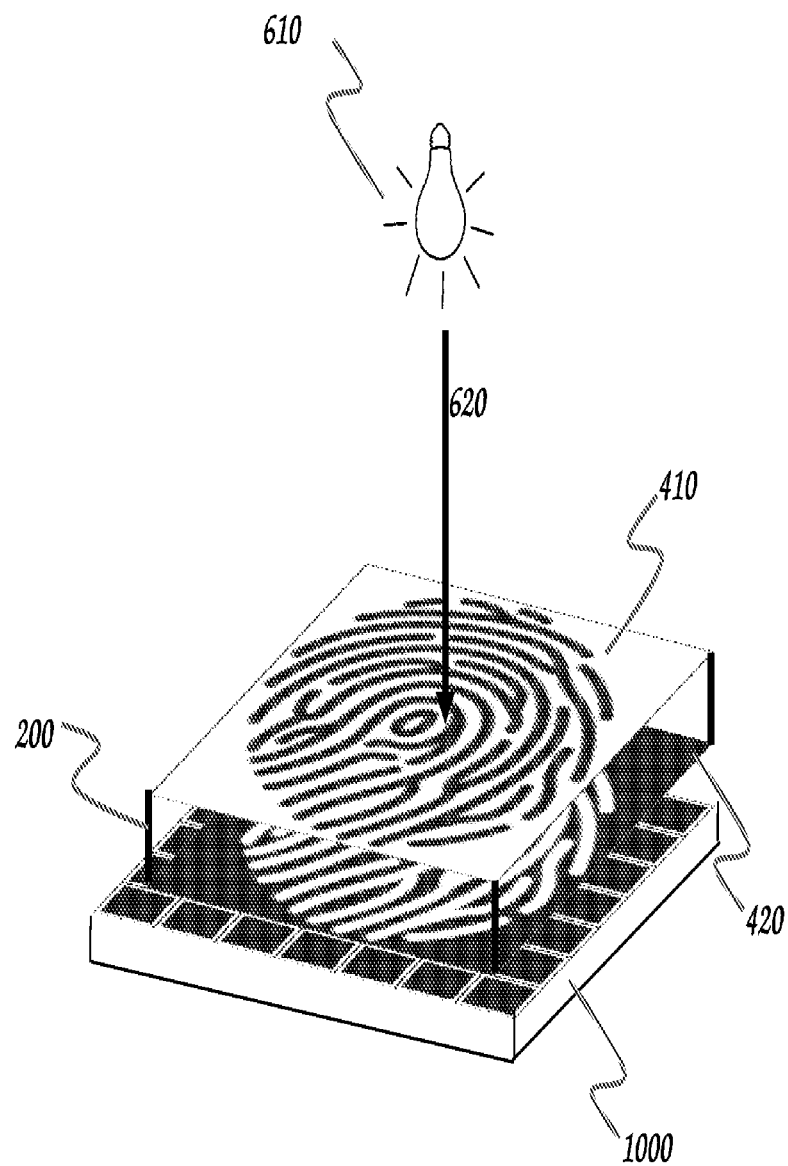
FIG. 10 shows a transistor array configured to capture a fingerprint image by passing light through an electrophoretic material.

In yet another exemplary embodiment of the present invention, the use of a transistor array to capture a fingerprint image optically is presented in FIG. 10. Transistor array 1000, having pixels configured with photodiodes, is coupled to opposing side fingerprint image 420 of electrophoretic display material 200. Illumination source 610 provides illumination 620 which passes through electrophoretic display material 200 onto the pixels of transistor array 1000. Each pixel produces a charge output proportional to the degree of illumination, by means already discussed supra. The individual pixel responses are accumulated and organized to produce the fingerprint image.

Figure 11:
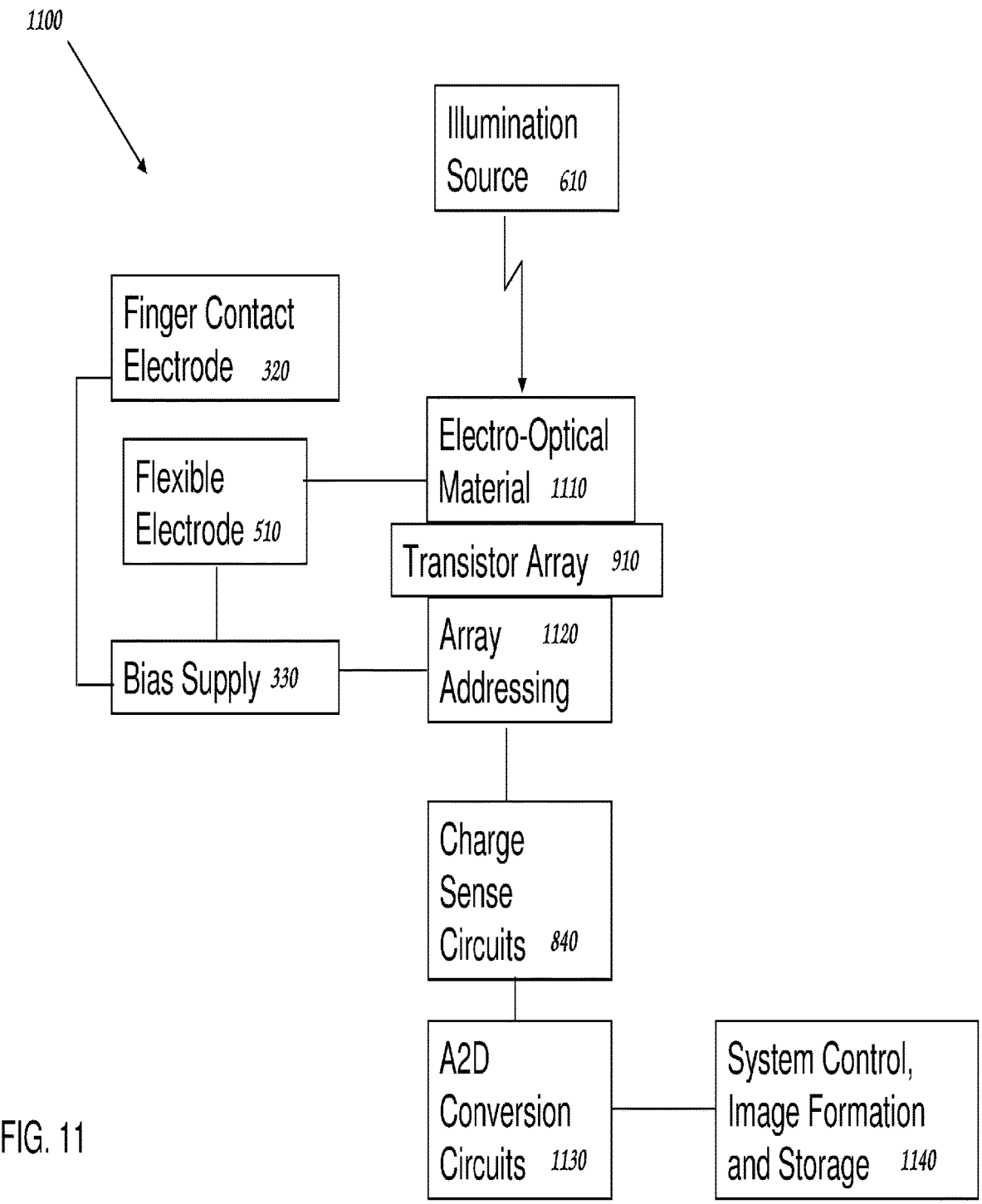
FIG. 11 shows a block diagram for a fingerprint image capture system.

A system for the acquisition and storage of fingerprints according to the present invention appears in FIG. 11. Improved fingerprint acquisition system 1100 comprises electro-optical material 1110 coupled to transistor array 910. Array addressing electronics 1120 provides electrical controllable electrical connections to gate and drain lines of transistor array 910. Direct current (DC) bias supply 330 provides a controllable electrical potential to flexible electrode film 510 and finger contact electrode 320. Direct current (DC) bias supply 330 may be configured to provide a plurality of electrical potentials in order to provide multiple control voltages required by the system. The direct current (DC) bias supply 330 is also coupled to the array addressing electronics 1120 to provide suitable electrical potentials to the gate and drain lines of transistor array 910. The drain lines of transistor array 910 are coupled to charge sense amplifiers 840 which provide voltage potentials proportional to the charge present on the drain lines of transistor array 910. The charge sense amplifiers 840 are coupled to analog to digital (ADC) conversion circuits 1130 which convert the voltage potential outputs of the charge sense amplifiers 840 into digital representations which can be interpreted by a computer. The outputs of the analog to digital (ADC) conversion circuits are fed to a system control computer 1140 which performs the tasks of system control, image formation, and image storage. The illumination source 610 can be optionally included in the system for the purpose of observing the acquired fingerprint image. In an alternate embodiment of the present invention, improved fingerprint acquisition system 1100 can be configured to capture the fingerprint image optically, using transistor array 1000 having photodiode pixels. In this instance, the illumination source 610 provides the illumination necessary to convey the fingerprint image into transistor array 1000.

In the foregoing specification, the present invention has been described with reference to specific embodiments thereof. It will, however, be evident to a skilled artisan that various modifications and changes can be made thereto without departing from the broader spirit and scope of the present invention as set forth in the appended claims. For example, although the apparatus and method of the present invention is described primarily in reference to the acquisition of fingerprints, skilled artisans will appreciate that the present invention may be applied to footprints, palm prints, or to any portion of the anatomy having epidermal ridges. Additionally, although the present invention is described with reference to human anatomy, those same skilled artisans will recognize that the present invention can be applied to other animal species which possess anatomical features appropriate to imaging. Additionally, although multiple methods of storing the fingerprint image captured by means of electrophoretic display material have been described, skilled artisans will recognize that additional storage methods are possible. Finally, skilled artisans will also recognize that although the present invention is described in association with electrophoretic materials typically employed for display applications, that customized electrophoretic materials are possible to further the scope and utility of the present invention. Additionally, other materials which exhibit a change in optical properties as a function of electric field may be utilized in order to capture the fingerprint image. The specification and drawings are, accordingly, to be regarded in an illustrative rather than a restrictive sense.

What is claimed is:

1. A system for capturing a biometric object print image, comprising:
    an electrophoretic display comprising an electro-optical material that produces a change in optical properties in response to an applied electric field, the electro-optical material comprising micro-capsules that comprise a negatively charged dark pigment suspended in a transparent fluid;
    a bottom electrode electrically coupled with a first electrical bias supply, the bottom electrode electrically coupled with the electro-optical material; and
    a first top electrode electrically coupled with a second electrical bias supply;
    wherein the first top electrode operably, electrically couples with a biometric object;
    wherein bringing the biometric object into contact with the electrophoretic display completes an electrical circuit between the top electrode and the bottom electrode in a first electrical bias mode resulting in the dark pigment of the microcapsules becoming visible at the surface of the electrophoretic display merely at a location of contact of the biometric object with the surface of the electrophoretic display, thereby generating an image of a print of a portion of the biometric object that contacts the electrophoretic display; and
    wherein removing the biometric object from contact with the electrophoretic display results in the image of the print of the biometric object remaining on the surface of the electrophoretic display.

2. The system of claim 1, the electro-optical material comprising micro-capsules that comprise a positively charged white pigment.

3. The system of claim 2, the electrophoretic display comprising a second top electrode in contact with the electro-optical material, the second top electrode electrically coupled with the second electrical bias supply to selectably provide a second electrical bias mode, resulting in the white pigment to be displayed at the surface of the electrophoretic display.

4. The system of claim 2, comprising an initialization electrode that is mechanically brought into contact with the top side of the electro-optical material, the initialization electrode electrically coupled with the second electrical bias supply.

5. The system of claim 1, the first electrical bias supply and the second electrical bias supply respectively comprising one of:
    the same electrical bias supply; and
    different electrical bias supplies.

6. The system of claim 1, comprising a thin film transistor array comprising a plurality of pixels, and configured to convert an optical signal incident upon a pixel into an electrical charge, the transistor array mechanically coupled to the electrophoretic display during an electronic capture of a fingerprint image.

7. The system of claim 6, comprising an illumination source configured to pass light through a fingerprint image present in the electro-optical material, the light emerging onto the thin film transistor array.

8. The system of claim 7, wherein the illumination source operates at a wavelength not within the human visible spectrum.

9. The method of claim 6 wherein the thin film transistor array is disposed on a flexible substrate.

10. The system of claim 1, comprising a microprocessor-based control system which to operably coordinate system control functions for electrical bias control.

11. The system of claim 1, the electrophoretic display comprising a transparent protective layer disposed above the electro-optical material.

12. The system of claim 1, the electrophoretic display comprising a transparent electrode layer that is electrically coupled with the second electrical bias supply.

13. The system of claim 12, wherein bringing a biometric object into contact with a top surface of the electrophoretic display mechanically engages the transparent electrode with the electro-optical material to complete the top electrode and the bottom electrode in a first electrical bias mode.

14. The system of claim 1, the biometric object is electrically coupled with the first top electrode.

15. A system for capturing a biometric object print image, comprising:
    an electrophoretic display comprising:
        a free surface for receiving a target biometric object;
        an electrode layer;
        an electro-optical material layer disposed in contact with the electrode layer, between the free surface and the electrode layer, the electro-optical material layer comprising micro-capsules comprising a negatively charged dark-colored pigment suspended in transparent fluid;

a contact electrode positioned proximate the electrophoretic display to operably contact the target biometric object subjected to print imaging; and a direct current (DC) electrical bias source, the DC electrical bias source electrically coupled with the contact electrode to provide positive potential, and the DC electrical bias source electrically coupled with the electrode layer to provide negative potential;

wherein bringing the biometric object in contact with the contact electrode and the free surface completes an electrical circuit between the contact electrode and the transparent electrode resulting in the dark-colored pigment of the microcapsules becoming visible at the free surface of the electrophoretic display merely at a location of contact of the biometric object with the surface of the electrophoretic display, thereby generating an print image at the free surface of a print of a portion of the biometric object that contacts the electrophoretic display.

16. The system of claim 15, the micro-capsules comprising a positively charged light-colored pigment suspended in the transparent fluid.

17. The system of claim 16, comprising an initialization electrode operably disposed over and in contact with the free surface, the initialization electrode electrically coupled with a negative electrical potential, and the electrode layer electrically coupled with a positive electrical potential, resulting in the light-colored pigment of the microcapsules becoming visible at the free surface of the electrophoretic display where the initialization electrode contacts the free surface.

18. The system of claim 15, the electrode layer comprising a transparent electrode, and wherein the generating of the print image at the free surface of a print of a portion of the biometric object that contacts the electrophoretic display further generates a negative version of the print image at the opposing side of the electro-optical material layer viewable through the transparent electrode.

19. The system of claim 18, comprising a transistor array disposed beneath the electrode layer, and comprising a plurality of pixels, and configured to convert an optical signal incident upon a pixel into an electrical charge, the transistor array operably capturing an image of the negative print image.

20. A system for capturing a fingerprint print image, comprising:

an electrophoretic display comprising:

a protective layer comprising a free surface for receiving a target finger;

a transparent electrode layer;

an electro-optical material layer disposed in contact with the electrode layer, between the protective layer and the transparent electrode layer, the electro-optical material layer comprising micro-capsules comprising a negatively charged dark-colored pigment and light-colored pigment suspended in transparent fluid;

a contact electrode positioned proximate the electrophoretic display to operably contact the target finger subjected to fingerprinting; and a direct current (DC) electrical bias source, the DC electrical bias source electrically coupled with the contact electrode to provide positive potential, and the DC electrical bias source electrically coupled with the electrode layer to provide negative potential; and a transistor array disposed beneath the transparent electrode layer, and comprising a plurality of pixels, and configured to convert an optical signal incident upon a pixel into an electrical charge;

wherein bringing the biometric object in contact with the contact electrode and the free surface completes an electrical circuit between the contact electrode and the transparent electrode resulting in the dark-colored pigment of the microcapsules becoming visible at the free surface of the electrophoretic display merely at a location of contact of the biometric object with the surface of the electrophoretic display, thereby generating an print image at the free surface of a print of a portion of the biometric object that contacts the electrophoretic display; and wherein the generating of the print image at the free surface of a print of the portion of the biometric object that contacts the electrophoretic display further generates a negative version of the print image at the opposing side of the electro-optical material layer viewable through the transparent electrode.

* * * * *